United States Patent
Re

(10) Patent No.: US 7,134,303 B2
(45) Date of Patent: Nov. 14, 2006

(54) DEVICE FOR SOCKET-DEFORMING A TUBE END AND FOR ADJUSTING ITS LENGTH

(75) Inventor: Ersilio Re, Lazzate (IT)

(73) Assignee: OMTR S.R.L., Cermenate (IT)

( * ) Notice: Subject to any disclaimer, the term of this patent is extended or adjusted under 35 U.S.C. 154(b) by 128 days.

(21) Appl. No.: 10/250,945

(22) PCT Filed: Jul. 2, 2002

(86) PCT No.: PCT/EP02/07257

§ 371 (c)(1),
(2), (4) Date: Jul. 9, 2003

(87) PCT Pub. No.: WO03/045605

PCT Pub. Date: Jun. 5, 2003

(65) Prior Publication Data

US 2004/0050129 A1   Mar. 18, 2004

(30) Foreign Application Priority Data

Nov. 30, 2001   (IT) .................................... MI2001A2523

(51) Int. Cl.
   *B21D 1/08*   (2006.01)

(52) U.S. Cl. .................. 72/71; 72/70; 72/113; 72/120; 72/409.17; 72/482.4

(58) Field of Classification Search .............. 72/70, 72/71, 72, 113, 115, 117, 118, 119, 120, 392, 72/393, 370.01, 370.03, 370.06, 370.07, 72/370.08, 409.1, 409.17, 482.1, 482.3, 482.4

See application file for complete search history.

(56) References Cited

U.S. PATENT DOCUMENTS

| 3,648,500 | A |   | 3/1972  | Vaill |
| 3,817,079 | A | * | 6/1974  | Priester ........................ 72/392 |
| 3,857,666 | A | * | 12/1974 | Barnett ........................ 425/393 |
| 4,815,185 | A |   | 3/1989  | Gray |
| 5,329,796 | A | * | 7/1994  | Edmonds et al. ............... 72/71 |
| 6,502,443 | B1 | * | 1/2003 | Saito ............................. 72/75 |

FOREIGN PATENT DOCUMENTS

EP           0 234 920         9/1987

* cited by examiner

*Primary Examiner*—Ed Tolan
(74) *Attorney, Agent, or Firm*—Young & Thompson

(57) ABSTRACT

A device (1) for socket-deforming an end of a tube, for example a tube of a heat exchanger, and for cutting that tube to a desired length, the cutting taking place at the end to be deformed. The The device (1) comprises a deformation and cutting member (5) to be inserted into the tube to be worked, the member (5) comprising deforming means (15) arranged to at least locally modify the inner diameter of the deformation and cutting member (5) by varying its perimetral dimensions, said deforming means (15) being arranged to cooperate, for effecting said dimensional variation, with actuator means (40) with a movable support (12), the deforming elements carrying cutting elements (31) for separating an end tube portion by acting from the inside of the tube without chip removal, in order to obtain a deformed tube of the required length.

16 Claims, 4 Drawing Sheets

DEVICE FOR SOCKET-DEFORMING A TUBE END AND FOR ADJUSTING ITS LENGTH

CROSS REFERENCE TO RELATED APPLICATION

This is the 35 USC 371 national stage of International Application PCT/EP02/07257 filed on 2 Jul. 2002, which designated the United States of America.

FIELD OF THE INVENTION

The present invention relates to a device for socket-deforming a tube end and for adjusting its length.

BACKGROUND OF THE INVENTION

In hydraulic circuits or devices it is often necessary to connect two tubes together. This is generally done by forming a socket at the end of a first tube, possibly cutting the tube at said end to adjust its length to the desired value, and inserting the end of the second tube into this socket-deformed end after it has been cut to the desired length. The two tubes are then joined together by braze welding.

An operation of this type is generally carried out during the construction of heat exchangers comprising a finned pack traversed by tubes which must be of constant predetermined length across the outside of the finned pack. A free end of these tubes is subjected to the aforestated deformation and cutting operations in order to associate a curved interconnection element with the ends of two adjacent tubes and hence give continuity to the heat exchanger circuit.

The aforesaid deformation and cutting operations are currently carried out in two different successive operative stages with different dedicated tools. In the case of a heat exchanger with a plurality of tubes, for example two hundred and fifty, the fact of having to carry out the said operations in two different stages with different tools results in considerable production time and cost.

SUMMARY OF THE INVENTION

An object of the present invention is therefore to provide a device able to carry out both the deformation operation and the cutting operation on a tube in order to prepare it for connection to another tube member.

Another object is to provide a device of the stated type which, in constructing apparatus provided with a plurality of tubes to be connected together to define a single hydraulic circuit, such as that of a heat exchanger, enables the construction time and cost of the apparatus to be reduced.

A further object is to provide a device of the stated type which enables the tube to be cut without chip removal and a tube end to be formed with the desired length in accordance with precise requirements dictated by the particular use to which the tube is to be put.

Another object is to provide a device of the stated type which can be used manually or automatically.

These and further objects which will be apparent to the expert of the art are attained by a device in accordance with the accompanying claims.

BRIEF DESCRIPTION OF THE DRAWINGS

The present invention will be more apparent from the accompanying drawing, which is provided by way of non-limiting example and in which.

DETAILED DESCRIPTION OF THE INVENTION

With reference to said figures, a device according to the present invention is indicated overall by 1 and comprises a frame 2 supporting actuator means 3 and 4 for driving a deformation and cutting member 5 for a tube (not shown).

Figure 1:
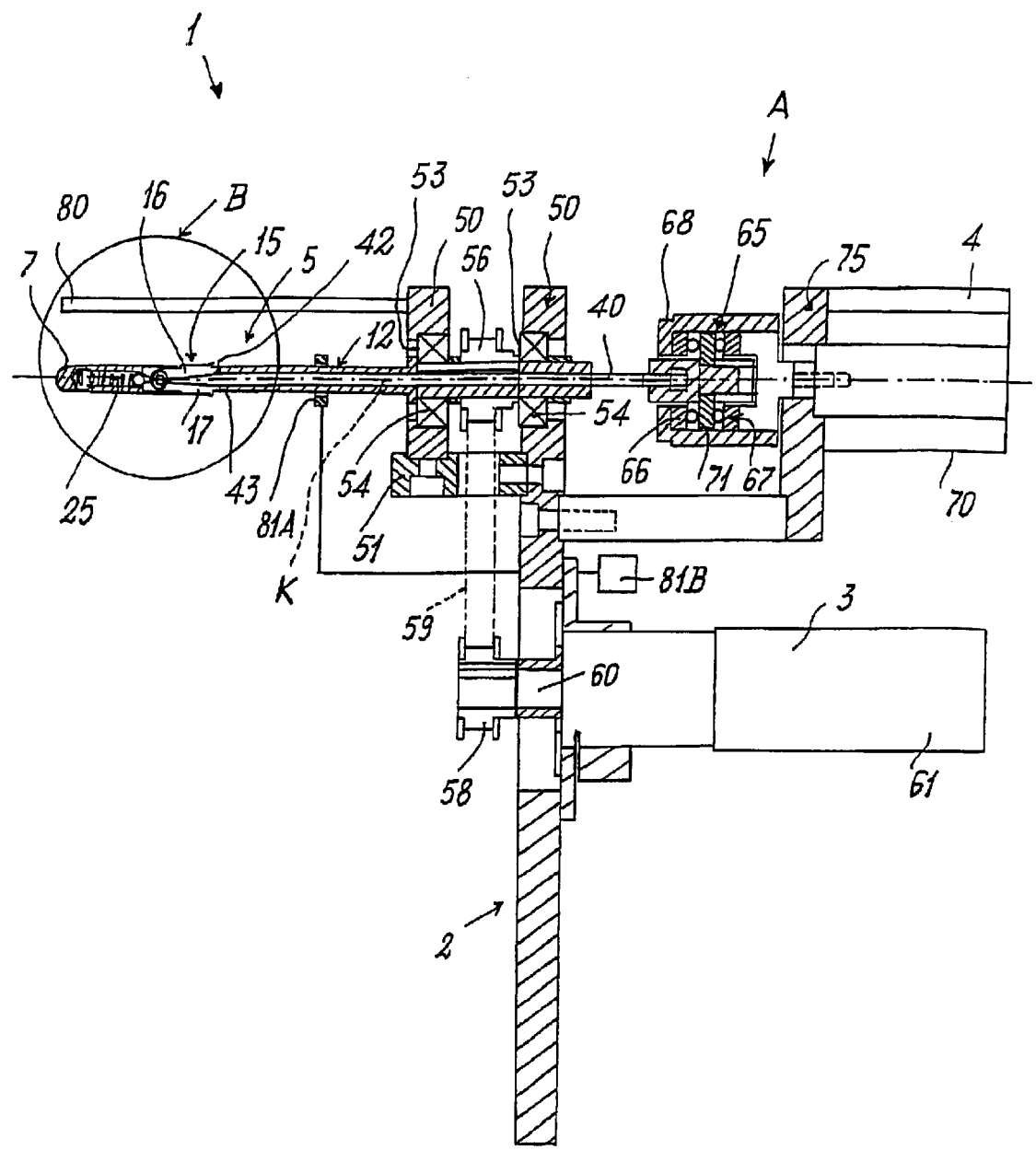
FIG. 1 is a longitudinal side section through a device according to the invention.
Figure 2:
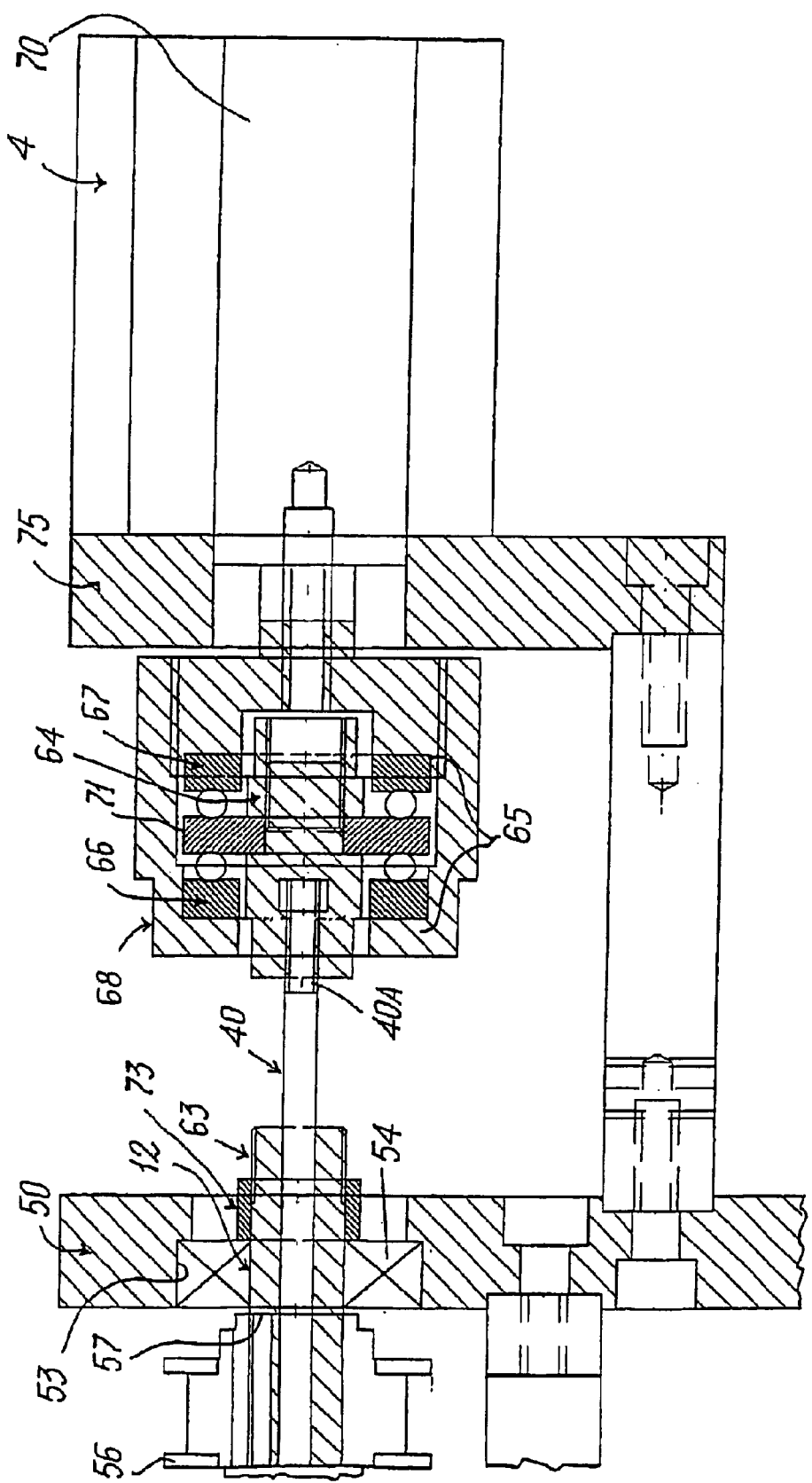
FIG. 2 is an enlarged view of that part of the device of the invention indicated by the arrow A in FIG. 1.
Figure 3:
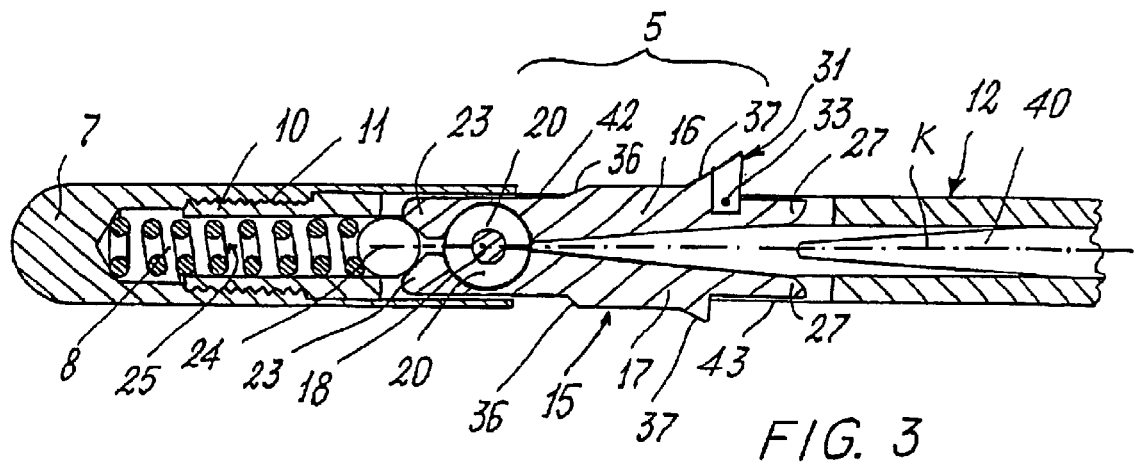
FIG. 3 is an enlarged view of that part of the device of the invention indicated by B in FIG. 1.
Figure 4:
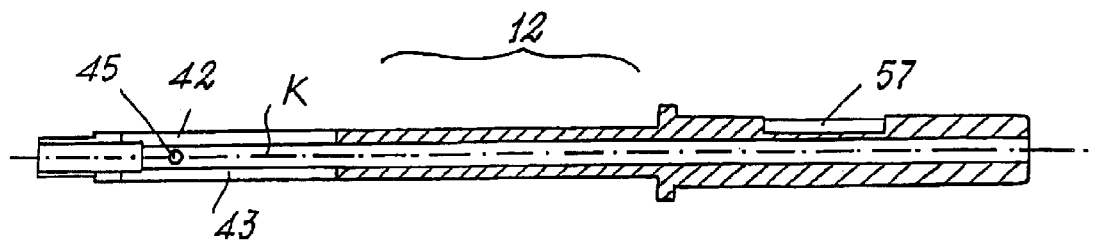
FIG. 4 is a section through a portion of the device of the invention taken on the line 5—5 of FIG. 5.
Figure 5:
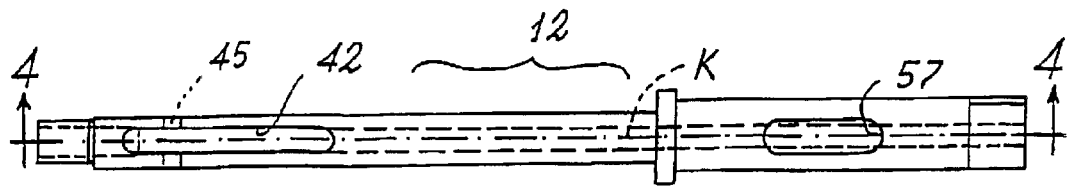
FIG. 5 is a plan view of that portion of the device shown in FIG. 4.
Figure 6:
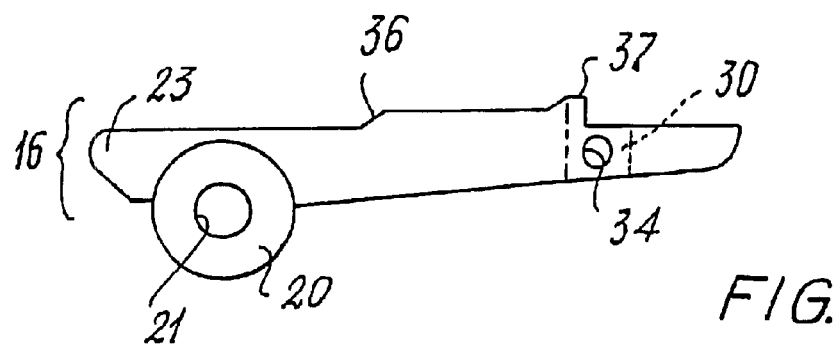
FIGS. 6, 7 and 8 are respectively a front view, a view from below and a section on the line 8—8 of FIG. 7, of a component of a part of the device according to the invention.
Figure 7:
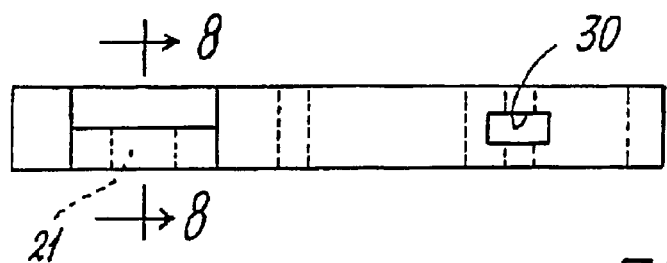
Figure 8:
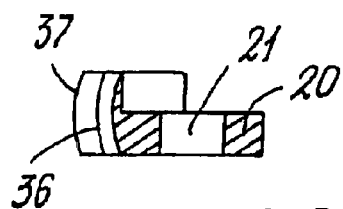
Figure 9:
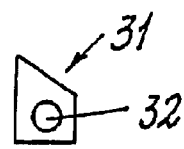
FIG. 9 shows an insert of that component of the device part shown in FIGS. 6–8.
Figure 10:
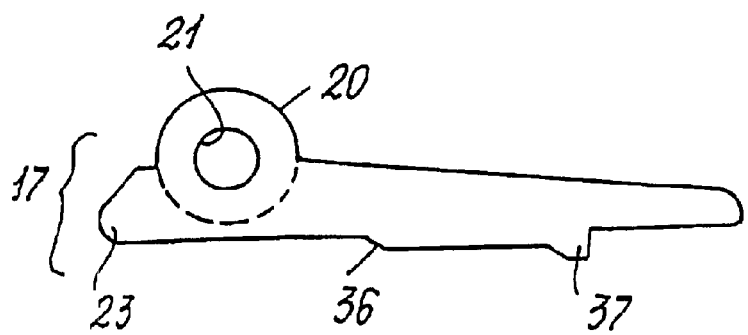
FIG. 10 shows a different component of that part of the device presenting the component of FIGS. 6–8.

The member 5 is to be inserted into that end of the tube to be worked. It comprises a terminal part 7, hollow at 8, removably coupled (for example by screwing via a thread 10) to an end 11 of a tubular support element 12 connected to the actuator means 3. In the example, the end 11 is also threaded. The member 5 comprises a deforming and cutting tool 15 having two parts 16 and 17 (see FIGS. 3, 6, 7, 8 and 10) connected by a pin 18 which connects together two of their circular portions 20 which are axially holed at 21. The pin 18 is positioned through the hole 21 in the portions 20 of the parts 16 and 17.

Each part 16 and 17 of the tool 15 presents a first flared end 23; when these parts are coupled together, their ends 23 define a seat for a spherical element 24 subjected to the thrust of a spring 25 inserted into the cavity 8 in the end part 7 of the member 5 and into the end 11 of the tubular element 12. By cooperating with the ends 23 of the parts 16 and 17 under the thrust of the spring 25, the spherical element 24 tends to maintain the second ends 27 of said facing parts 16 and 17 at least close together (as in FIG. 3).

In the second end 27 of the part 16 of the tool 15 there is provided a seat 30 for containing a cutting member 31 (with at least one free cutting edge of blade type) presenting a hole 32 for containing a pin 33 disposed in a seat 34 of the part 16, said pin 33 being removable and enabling the member 31 to be fixed to said part 16 (but also removed therefrom).

Each part 16 and 17 of the tool 15 presents a series of peripheral raised portions 36 and 37 of different heights for deforming the end of the tube following the insertion of the member 5 into it. The cutting member 31 projects however from the part 16 of the tool 15 of the member 5 more than the raised portion 37 of this part.

The second ends 27 of the parts 16 and 17 are arranged to be urged apart by a pusher 40 also inserted into the tubular element 12 and rigid with the already described actuator means. The pusher 40 can penetrate between those ends 27 maintained close together by the aforestated thrust action of the spherical element 24 on the first ends 23 of the parts 16 and 17 of the tool 15; in this manner it causes them to diverge so as to push at least the raised portions 37 and the cutting member 31 to the outside of opposing elongate holes 42 and 43 provided in the tubular element 12. This latter presents a seat 45 for the said pin 18, this pin being able to be extracted from said seat.

The tubular element 12 is supported by shoulders 50 carried (removably) by a bracket 51 of the frame 2. The shoulders 50 present through holes 53 through which the element 12 penetrates, bearings 54 being positioned in these holes to enable the element 12 (and hence the member 5 and the pusher 40) to rotate about its longitudinal axis K. This rotation is obtained by the movement of a pulley 56 keyed onto the element 12 by a key (not shown) inserted into an aperture 57 in this element. This latter is shown in the drawings as being in one piece, but it can also be formed as two or more torsionally rigid parts, the part carrying the member 5 being of particular shape based on this member.

The pulley 56 cooperates with a second pulley 58 via a transmission member 59, for example a belt. The pulley 58 is keyed onto the exit shaft of a pneumatic actuator or motor 61 defining the actuator means 3. The motor 61 is carried by the frame 2.

The tubular element 12 is open at the end 63 distant from the aforesaid end 11. The pusher 40 projects from the end 63. One end 40A of this pusher is rigid with a part 64 carried by an axial bearing 65 comprising two end retainers 66 and 67 translating within a casing 68 under the thrust action of for example a pneumatic actuator 70 carried by the frame 2 and defining the means 4 by way of a shoulder 75. Translation takes place along the axis K. In contrast, an intermediate retainer 71 is rigid with the part 64 and is idle with respect to the retainers 66 and 67 to enable the part 64 and the pusher 40 to rotate about the axis K dragged by the (rotating) element 12 to which the latter is fixed by a ring nut 73 positioned at the end 63 of said element.

By virtue of the described arrangement, the member 5 can deform the end of a tube and cut off a portion thereof in order to adjusts the tube length. The use of the device 1 commences by inserting the part 7 and the member 5 (or rather its tool 15) into the end of the tube to be worked. The depth of this insertion can be adjusted by a spacer rod 80 associated with the shoulder 50 and parallel to the element 12.

Having done this, the actuator 70 is actuated to move the pusher 40 along the axis K so that the raised portions 36 and 37 of the tool are brought to bear against the inner wall of the tube and deform this latter.

The pneumatic actuator 61 is then activated to rotate the pulleys 56 and 58 and hence the element 12 (the almost simultaneous activation of the actuator 61 and actuator 70 is achieved by operating a known control member, for example a trigger). As a result of this, by virtue of the torsional coupling between the tool 15 and this element, the cutting member 31 rotates to hence cut the tube starting from its interior, without chip formation. That tube part separated by cutting remains on the element 12 and can be extracted from it by bending said element or by an extractor member, for example pneumatic, presenting a pusher 81A positioned on the element 12, and an actuator 81B.

The aforedescribed device can be used manually (by supporting the frame 2) or automatically (by applying the frame 2 to a support programmable along the X, Y and Z axes) with the relative controls for the actuators 61 and 70.

It should also be noted that the element 12 can be rotated about the K axis at different speeds, depending on the material of the tube to be worked.

A preferred embodiment of the invention has been described. Others can however be obtained in the light of the aforegoing description (such as one in which the member 5 presents pneumatic or mechanical parts to be moved radially in order to modify the radial dimension of said member).

These embodiments must also be considered as lying within the scope of the present document.

What is claimed is:

1. A device for socket-deforming an end of a tube, and for cutting the tube to a desired length, said cutting taking place at the end to be deformed, the device comprising:
    a deformation and cutting member to be inserted into the tube to be worked;
    said member having an inner diameter and comprising deforming means arranged to at least locally modify the inner diameter of the deformation and cutting member by varying its perimetral dimensions;
    said deforming means comprising a deforming tool and being arranged to cooperate with actuator means associated with a movable support;
    said actuator means extending along a longitudinal axis, and being able to translate along and rotate about said axis;
    cutting means for separating an end tube portion by acting from the tube interior, without chip removal, in order to obtain a deformed tube having the desired length;
    the deforming tool comprising parts hinged together and carrying projecting portions arranged to deform the tube from its interior;
    said parts having first ends cooperating with a presser member and second ends cooperating with the actuator means;
    said actuator means acting on the second ends in such a manner as to urge them apart in order to deform and cut the tube, said action opposing the action of the presser member which maintains said second ends close together; and
    said cutting means being carried by at least one of the parts of the deforming tool.

2. The device according to claim 1, wherein the presser member comprises a body with an at least partly curved surface cooperating with the first ends of the parts of the deforming tool, said first ends being flared and partially receiving said body when the second ends of said parts are close together.

3. The device according to claim 2, wherein the presser member body is a ball.

4. The device according to claim 3, wherein the presser member body is urged against the deforming tool by a spring or elastic element inserted into a seat in one end of the deformation and cutting member.

5. The device according to claim 2, wherein the presser member body is urged against the deforming tool by a spring or elastic element inserted into a seat in one end of the deformation and cutting member.

6. The device according to claim 5, wherein the end of the deformation and cutting member is removably associated with one end of a tubular element defining the movable support for the actuator means; said movable support also carrying the deformation and cutting member.

7. The device according to claim 6, wherein the tubular element presents apertures in which the projecting portions are positioned, the actuator means being positioned within the tubular element.

8. The device according to claim 7, wherein the tubular element comprises a plurality of parts removably coupled together.

9. The device according to claim 1, wherein the actuator means comprise a pusher arranged to translate along said longitudinal axis, said movable support being subjected to the action of an actuator arranged to generate the translation at controlled moments.

10. The device according to claim 9, wherein the pusher is torsionally rigid with the movable support, which is connected to actuator means for its rotation about its longitudinal axis which is identical to that of the pusher.

11. The device according to claim 1, further comprising expulsion means for expelling the cut part of the tube from the movable support.

12. The device according to claim 11, wherein the spacer means comprise a rod which is parallel to the movable support for the actuator means and is associated with a support frame.

13. The device according to claim 1, wherein the cutting means comprise a member having a bladed cutting end.

14. The device according to claim 1, wherein the cutting means are removably associated with the deforming tool.

15. The device according to claim 1, wherein the deformation and cutting member, the actuator means and the respective movable support are associated with a single support frame.

16. The device according to claim 1, further comprising spacer means for defining the depth of insertion of the deformation and cutting member within the tube to be worked.

* * * * *